(12) United States Patent
Ishikawa

(10) Patent No.: US 8,241,158 B2
(45) Date of Patent: Aug. 14, 2012

(54) BICYCLE DERAILLEUR APPARATUS WITH A SUPPORTED POWER SUPPLY

(75) Inventor: Noriyasu Ishikawa, Sakai (JP)

(73) Assignee: Shimano, Inc., Sakai (JP)

( * ) Notice: Subject to any disclaimer, the term of this patent is extended or adjusted under 35 U.S.C. 154(b) by 791 days.

(21) Appl. No.: 11/423,536

(22) Filed: Jun. 12, 2006

(65) Prior Publication Data

US 2007/0037645 A1   Feb. 15, 2007

(30) Foreign Application Priority Data

Aug. 9, 2005  (JP) ................. 2005-230858

(51) Int. Cl.
*F16H 9/00* (2006.01)
*F16H 59/00* (2006.01)
*F16H 61/00* (2006.01)
*F16H 63/00* (2006.01)

(52) U.S. Cl. ................ 474/80; 474/82

(58) Field of Classification Search .......... 474/70, 474/80, 82, 81
See application file for complete search history.

(56) References Cited

U.S. PATENT DOCUMENTS

| | | | | |
|---|---|---|---|---|
| 642,906 | A * | 2/1900 | Hedgeland | 362/476 |
| 1,439,430 | A * | 12/1922 | Lyhne | 429/97 |
| 3,878,387 | A * | 4/1975 | Kovacic | 362/473 |
| 4,019,171 | A | 4/1977 | Martelet | |
| 4,077,485 | A * | 3/1978 | Bonora et al. | 180/68.5 |
| 4,204,191 | A | 5/1980 | Daniels | |
| 4,339,060 | A * | 7/1982 | Braida, Jr. | 224/428 |
| 4,586,113 | A * | 4/1986 | Tsuyama | 362/473 |
| 4,754,827 | A * | 7/1988 | Hirabayashi | 180/68.5 |
| 5,199,929 | A | 4/1993 | Stites | |
| 5,213,548 | A * | 5/1993 | Colbert et al. | 474/71 |
| 5,276,593 | A | 1/1994 | Lighthill et al. | |
| 5,378,553 | A * | 1/1995 | Shoji | 429/97 |
| 5,470,277 | A * | 11/1995 | Romano | 474/70 |
| 5,474,150 | A * | 12/1995 | Mabuchi | 180/220 |
| 5,480,356 | A | 1/1996 | Campagnolo | |
| 5,570,752 | A | 11/1996 | Takata | |
| 5,577,969 | A * | 11/1996 | Watarai | 474/78 |
| 5,597,225 | A * | 1/1997 | Davis | 362/473 |
| 5,599,244 | A * | 2/1997 | Ethington | 474/70 |
| 5,641,220 | A * | 6/1997 | Sutherland et al. | 362/475 |
| 5,653,649 | A * | 8/1997 | Watarai | 474/78 |
| 5,681,234 | A * | 10/1997 | Ethington | 474/70 |
| 5,728,017 | A | 3/1998 | Bellio et al. | |

(Continued)

FOREIGN PATENT DOCUMENTS

JP   62-067463 U   4/1987

(Continued)

OTHER PUBLICATIONS

European Search Report for EP 06016545.3, the European equivalent of this application, dated Sep. 14, 2007.

*Primary Examiner* — William A Rivera
*Assistant Examiner* — Henry Liu
(74) *Attorney, Agent, or Firm* — James A. Deland

(57) ABSTRACT

A bicycle derailleur apparatus comprises a derailleur including a mounting member adapted to be mounted to a bicycle frame and a chain guide coupled to the mounting member so that the chain guide moves relative to the mounting member. A power storing unit is supported by the derailleur.

33 Claims, 9 Drawing Sheets

U.S. PATENT DOCUMENTS

| | | | | |
|---|---|---|---|---|
| 5,865,454 A | * | 2/1999 | Campagnolo | 280/238 |
| 5,904,072 A | * | 5/1999 | Yamanaka | 74/594.2 |
| 6,095,270 A | | 8/2000 | Ishikawa | |
| 6,148,944 A | * | 11/2000 | Adomi et al. | 180/220 |
| 6,162,140 A | | 12/2000 | Fukuda | |
| 6,230,834 B1 | * | 5/2001 | Van Hout et al. | 180/68.5 |
| 6,244,415 B1 | * | 6/2001 | Fujii | 192/217 |
| 6,264,351 B1 | * | 7/2001 | Taylor et al. | 362/475 |
| 6,286,982 B1 | | 9/2001 | Tashiro | |
| 6,423,443 B1 | | 7/2002 | Tsuboi et al. | |
| 6,453,262 B1 | * | 9/2002 | Kitamura | 702/145 |
| 6,501,245 B2 | | 12/2002 | Okuda | |
| 6,558,180 B2 | | 5/2003 | Nishimoto | |
| 6,597,166 B2 | | 7/2003 | Meggiolan | |
| 6,600,411 B2 | | 7/2003 | Nishimoto | |
| 6,623,389 B1 | * | 9/2003 | Campagnolo | 474/70 |
| 6,648,686 B2 | | 11/2003 | Nishimoto | |
| 6,669,220 B2 | | 12/2003 | Meggiolan | |
| 6,679,797 B2 | * | 1/2004 | Valle | 474/80 |
| 6,726,586 B2 | * | 4/2004 | Fukuda | 474/70 |
| 6,761,655 B2 | * | 7/2004 | Fukuda | 474/70 |
| 6,843,741 B2 | * | 1/2005 | Fujii | 474/70 |
| 6,979,009 B2 | * | 12/2005 | Ichida et al. | 280/238 |
| 7,243,937 B2 | * | 7/2007 | Ishikawa | 280/288.4 |
| 7,341,532 B2 | * | 3/2008 | Ichida et al. | 474/70 |
| 7,381,142 B2 | * | 6/2008 | Campagnolo | 474/70 |
| 7,442,136 B2 | * | 10/2008 | Ichida et al. | 474/82 |
| 7,614,469 B2 | * | 11/2009 | Kumar et al. | 180/68.5 |
| 2001/0042767 A1 | | 11/2001 | Campagnolo | |
| 2001/0046916 A1 | * | 11/2001 | Fujii | 474/144 |
| 2002/0052258 A1 | * | 5/2002 | Meggiolan | 474/70 |
| 2002/0190173 A1 | * | 12/2002 | Fujii | 248/300 |
| 2003/0022743 A1 | | 1/2003 | Meggiolan | |
| 2003/0027674 A1 | * | 2/2003 | Valle | 474/70 |
| 2004/0063528 A1 | | 4/2004 | Campagnolo | |
| 2006/0186631 A1 | * | 8/2006 | Ishikawa | 280/260 |

FOREIGN PATENT DOCUMENTS

| | | |
|---|---|---|
| JP | 2002-2571 A | 1/2002 |
| JP | 2003-231487 A | 8/2003 |

* cited by examiner

BICYCLE DERAILLEUR APPARATUS WITH A SUPPORTED POWER SUPPLY

BACKGROUND OF THE INVENTION

The present invention is directed to bicycles and, more particularly, to a bicycle derailleur apparatus with a supported power supply.

Electrically operated derailleurs that use electric drive units including electric motors, solenoids, etc. to operate the chain guide are known. Such a derailleur is shown in Japanese Patent Laid-Open Application No. 2002-2571. In such derailleurs, a control unit controls the operation of the drive unit, and a power supply unit supplies electric power to the control unit and to the drive unit. Conventional power supply units typically mount to the bicycle frame together with a bottle cage support fixed to the bicycle frame. The power supply unit has a container for the control unit and a container for a battery which supplies electric power to the control unit and to the drive unit. The battery is electrically connected to the control unit and to the drive unit by wiring.

In known electrically operated derailleurs, the derailleur and the power supply unit are spaced apart from each other, so the wiring which connects the power supply unit to the other components is long. This creates the risk that the electric wiring may become entangled with obstacles and breaks. Furthermore, the long wiring must be routed along the bicycle frame, which can be complicated and unsightly. Also, the long wiring creates additional electrical resistance which can interfere with control signals and waste electrical power. Also, the derailleur and the power supply unit must be separately mounted to the frame, thereby complicating assembly.

SUMMARY OF THE INVENTION

The present invention is directed to various features of a bicycle derailleur apparatus. In one embodiment, a bicycle derailleur apparatus comprises a derailleur including a mounting member adapted to be mounted to a bicycle frame and a chain guide coupled to the mounting member so that the chain guide moves relative to the mounting member. A power storing unit is supported by the derailleur. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
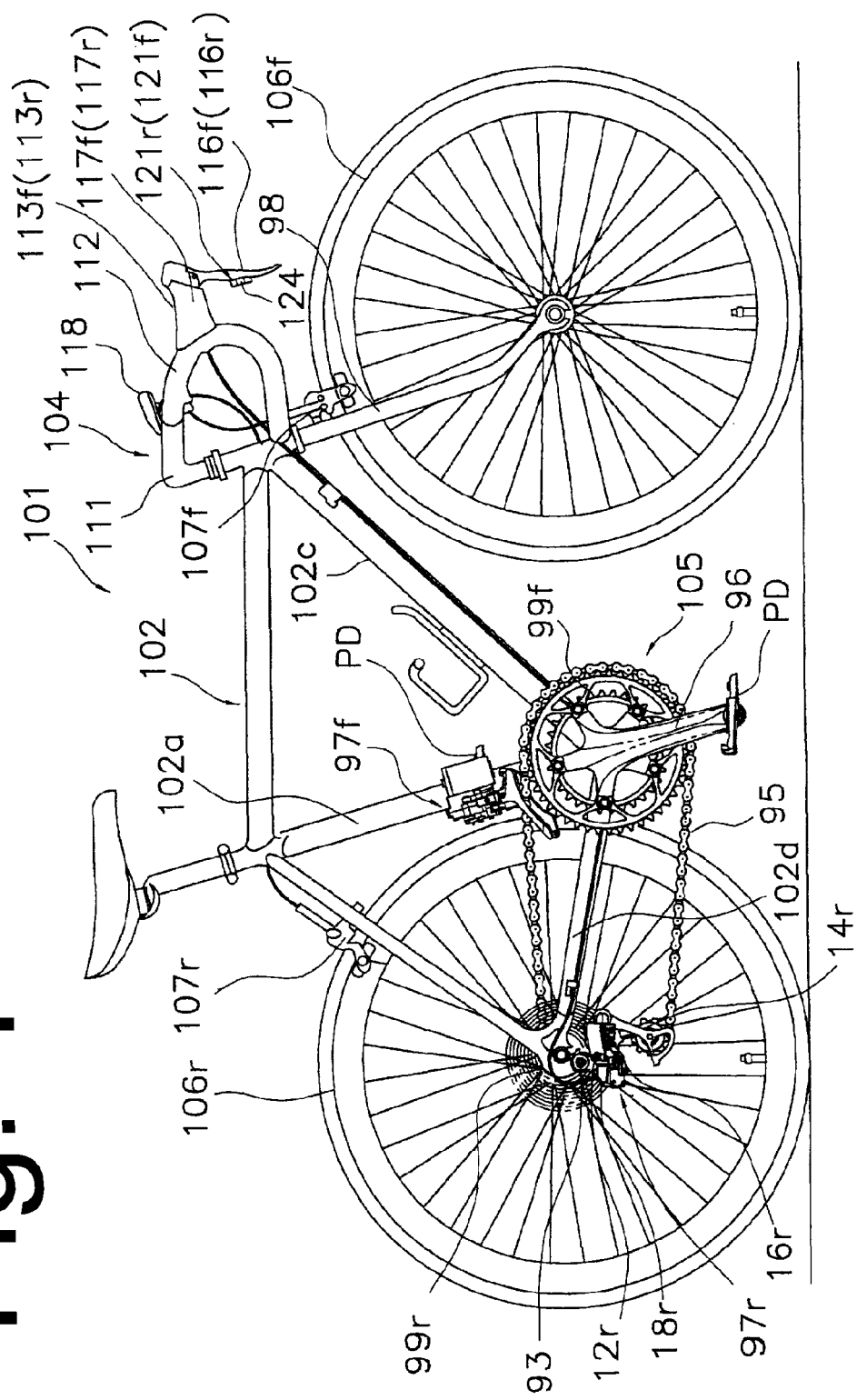
FIG. 1 is a side view of a particular embodiment of a bicycle.

FIG. 1 is a side view of a bicycle 101 that includes particular embodiments of electrically controlled components. Bicycle 101 is a road bicycle comprising a diamond-shaped frame 102, a front fork 98 rotatably mounted to frame 102, a handlebar assembly 104 mounted to the upper part of fork 98, a front wheel 106$f$ rotatably attached to the lower part of fork 98, a rear wheel 106$r$ rotatably attached to the rear of frame 102, and a drive unit 105. A front wheel brake 107$f$ is provided for braking front wheel 106$f$, and a rear wheel brake 107$r$ is provided for braking rear wheel 106$r$.

Drive unit 105 comprises a chain 95, a front sprocket assembly 99$f$ coaxially mounted with a crank 96 having pedals PD, an electrically operated front derailleur 97$f$ attached to a seat tube 102$a$ of frame 102, a rear sprocket assembly 99$r$ coaxially mounted with rear wheel 106$r$, and an electrically operated rear derailleur 97$r$. In this embodiment, front sprocket assembly 99$f$ comprises two sprockets mounted coaxially with crank 96, and rear sprocket assembly 99$r$ comprises ten sprockets mounted coaxially with rear wheel 106$r$. Front derailleur 97$f$ moves to two operating positions to switch chain 95 between the two front sprockets, and rear derailleur 97$r$ moves to ten operating positions to switch chain 95 among selected ones of the ten rear sprockets.

Handlebar assembly 104 comprises a handlebar stem 111 and a drop-style handlebar 112, wherein handlebar stem 111 is mounted to the upper part of fork 98, and handlebar 112 is mounted to the forward end portion of handlebar stem 111. Brake lever assemblies 113$f$ and 113$r$ are mounted at opposite sides of handlebar 112. Brake lever assembly 113$f$ controls the operation of front wheel brake 107$f$, and brake lever assembly 113$r$ controls the operation of rear wheel brake 107$r$. A display unit 118 is attached to a central portion of handlebar 112. Display unit 118 displays the speed of the bicycle, distance traveled, gear position, etc. in a known manner.

Brake lever assemblies 113$f$ and 113$r$ comprise respective brake brackets 117$f$ and 117$r$ mounted to the forward curved portions of handlebar 112, and respective brake levers 116$f$ and 116$r$ pivotably mounted to brake brackets 117$f$ and 117$r$. A rear shift control device 121$r$ with a switch lever 124 is mounted to the rear side of brake lever 116$r$ so that the rider may control the operation of rear derailleur 97$r$ with the hand grasping brake lever 116$r$. Similarly, a front shift control device 121$f$ with a switch lever 124 is mounted to the rear side of brake lever 116$f$ so that the rider may control the operation of front derailleur 97$f$ with the hand grasping brake lever 116$f$. A front upshift switch (FSU-SW) 131$f$ (FIG. 7) and a front downshift switch (FSD-SW) 133$f$ are mounted in front shift control device 121$f$, and a rear upshift switch (RSU-SW) 131$r$ and a rear downshift switch (RSD-SW) 133$r$ are mounted in rear shift control device 121$r$.

Figure 2:
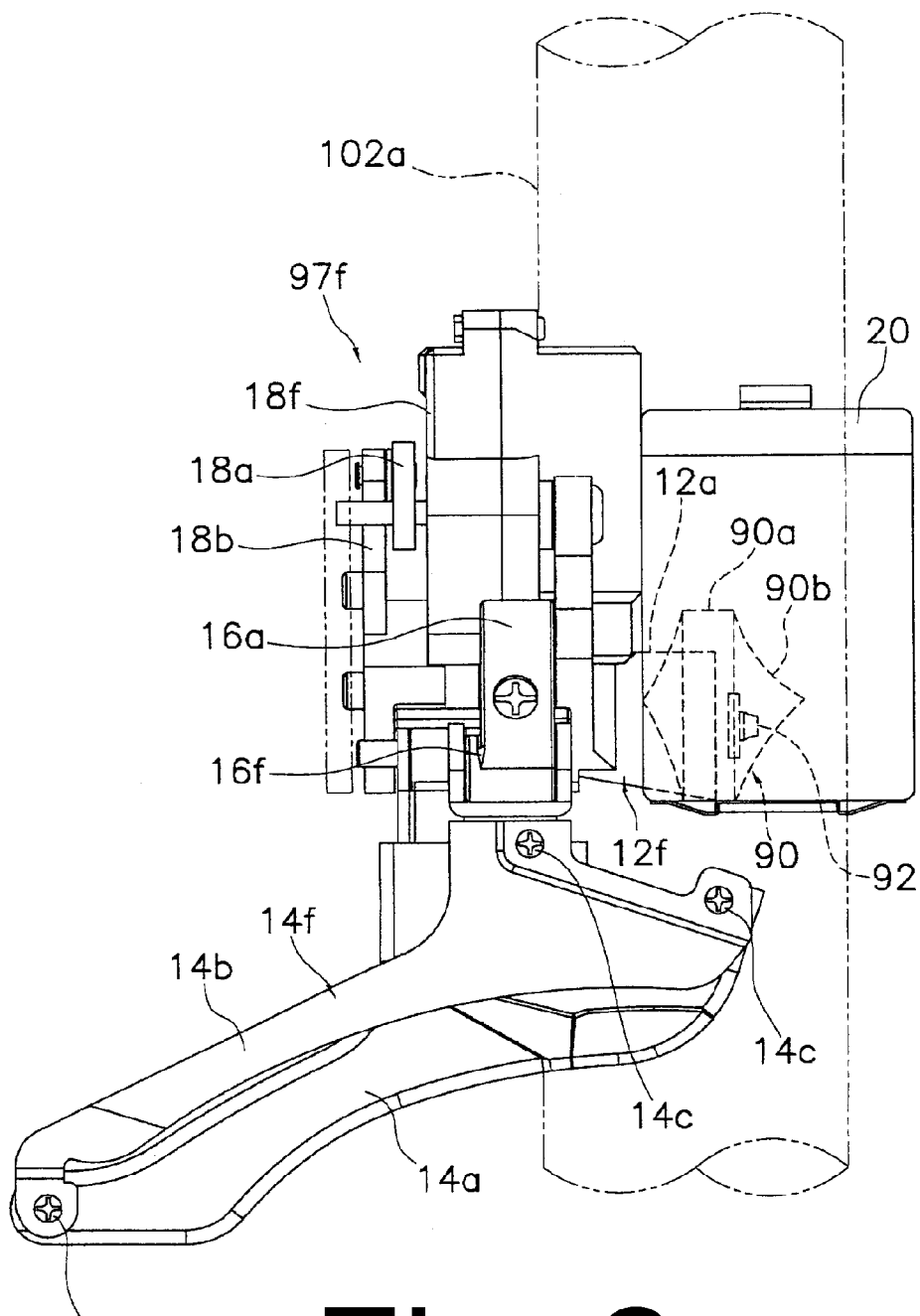
FIG. 2 is a side view of a particular embodiment of a front derailleur apparatus.
Figure 3:
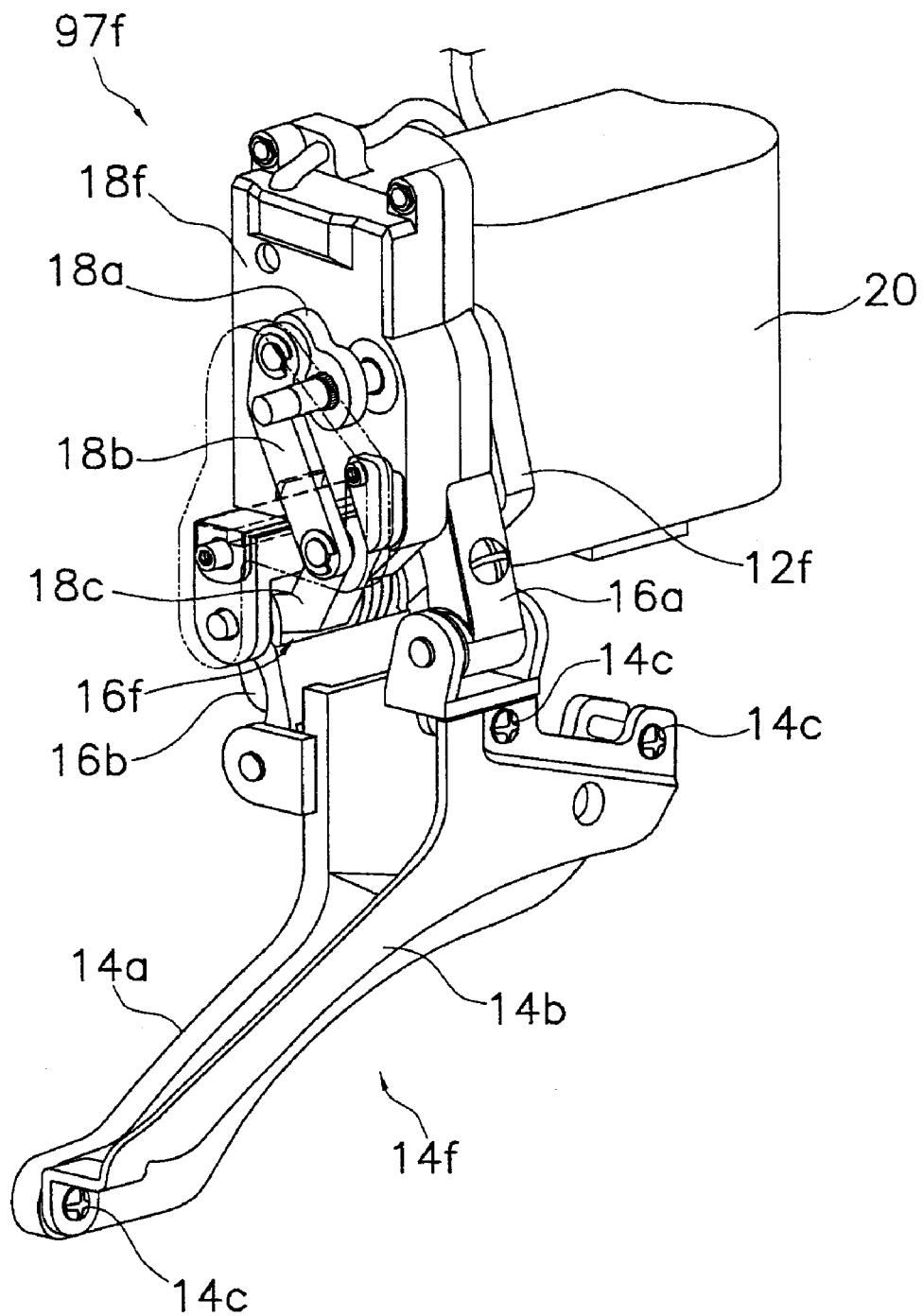
FIG. 3 is a rear oblique view of the front derailleur apparatus.

As shown in FIGS. 2 and 3, front derailleur 97$f$ includes a mounting member 12$f$ mounted to a frame mounting base 90 by a fixing bolt 92. Frame mounting base 90 has a derailleur mounting portion 90$a$ and a frame mounting portion 90$b$. Derailleur mounting portion 90$a$ has a recessed semicircular mounting surface 90$c$ (FIG. 6) in plan view, and a frame mounting portion 90$b$ curves along an outer peripheral surface of seat tube 102$a$. Mounting member 12$f$ of front derailleur 97$f$ has a semicircular mounting portion 12$a$ mounted to the semicircular mounting surface 90$c$ of derailleur mounting portion 90$a$ of frame mounting base 90, and frame mounting portion 90$b$ of frame mounting base 90 is mounted to seat tube 102$a$. In this embodiment, frame mounting base 90 is welded to seat tube 102$a$, but frame mounting base 90 may be fixed to seat tube 102$a$ by many other methods, such as by a band.

Figure 7:
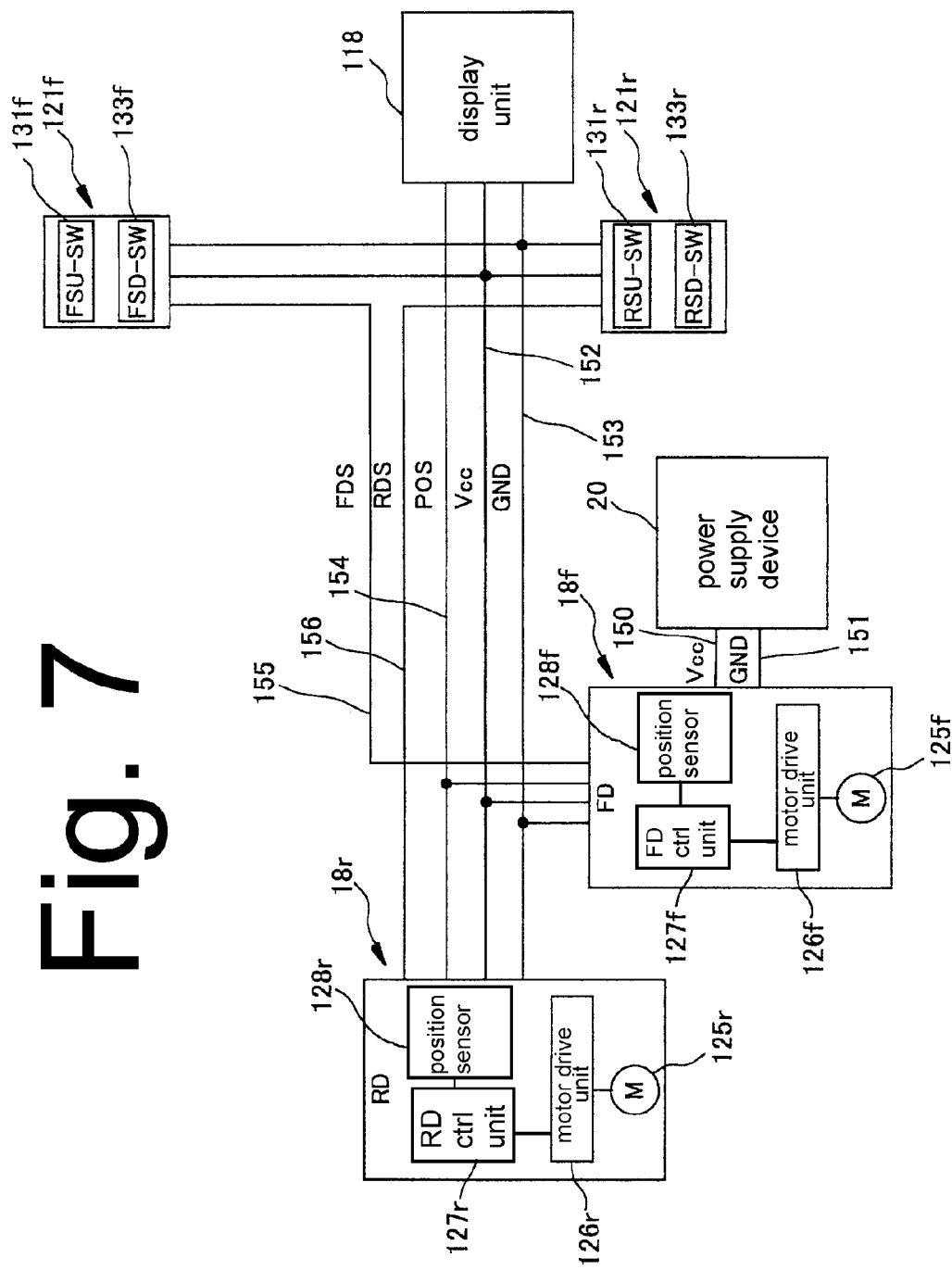
FIG. 7 is a schematic block diagram of a particular embodiment of a bicycle control system.

Front derailleur 97$f$ further comprises a chain guide 14$f$ a coupling unit in the form of a four-bar link mechanism 16$f$ that couples chain guide 14f to mounting member 12f so that chain guide 14f moves relative to mounting member 12f, an electric drive unit 18f that moves chain guide 14f via link mechanism 16f, and a power storing unit in the form of a power supply unit 20 that supplies electric power to drive unit 18f and to other components in the system. Link mechanism 16f includes an outer link 16a and an inner link 16b, wherein the upper ends of links 16a and 16b are pivotally connected to mounting member 12f, and the lower ends of links 16a and 16b are pivotally connected to chain guide 14f. In this embodiment, a lever member 18a rotated by drive unit 18f is connected to inner link 16b via a pair of power saver links 18b and 18c in a known manner. Chain guide 14f comprises an inner guide plate 14a and an outer guide plate 14b spaced apart and connected by screws 14c so that chain 95 can be inserted therethrough. As shown in FIG. 7, drive unit 18f comprises a front derailleur motor 125f that may include a gear reduction unit, a front motor drive unit 126f for driving front derailleur motor 125f, a front shift control unit 127f that includes a programmed microprocessor and other electronic components for controlling the positioning of front derailleur 97f in response to signals received from front shift control device 121f, and a front position sensor 128f that senses the operating position of front derailleur 97f.

As shown in FIG. 1, rear derailleur 97r comprises a mounting member 12r fixed to a rear portion of a chain stay 102d of frame 102 by a fixing bolt 93, a chain guide 14r, a coupling unit in the form of a four-bar link mechanism 16r that couples chain guide 14r to mounting member 12r so that chain guide 14r moves relative to mounting member 12r, and an electric drive unit 18r that moves chain guide 14r via link mechanism 16r. As shown in FIG. 7, drive unit 18r comprises a rear derailleur motor 125r that may include a gear reduction unit, a rear motor drive unit 126r for driving rear derailleur motor 125r, a rear shift control unit 127r that includes a programmed microprocessor and other electronic components for controlling the positioning of rear derailleur 97r in response to signals received from rear shift control device 121r, and a rear position sensor 128r that senses the operating position of rear derailleur 97r.

As shown in FIG. 7, power supply unit 20 supplies electric power to front and rear derailleurs 97f and 97r, to front and rear shift control devices 121f and 121r, and to display unit 118. More specifically, power supply unit 20 supplies electric power having a power supply voltage Vcc (e.g., 6-8.4 VDC) to drive unit 18f of front derailleur 97f through a power supply ($V_{cc}$) line 150 and a ground (GND) line 151. Power supply unit 20 also supplies electric power to drive unit 18r of rear derailleur 97r, to display unit 118 and to front and rear shift control devices 121f and 121r through a power supply line 152 and a ground line 153 connected to drive unit 18f. Shift position signals (POS) from position sensors 128f and 128r are communicated to display unit 118 through a shift position signal line 154 so that the operating positions of front and rear derailleurs 97f and 97r may be displayed on display unit 118. Shift command signals FDS and RDS generated in response to the operation of shift control devices 121f and 121r, respectively, are communicated to front and rear derailleurs 97f and 97r through respective shift command signal lines 155 and 156. In this embodiment, the various signal lines are physically connected to drive unit 18f and then physically routed to drive unit 18r. For example, drive unit 18f of front derailleur 97f may be connected to display unit 118 and to front and rear shift control devices 121f and 121r through a five-wire cable that runs along down tube 102c and contains all of the signals shown in the middle portion of FIG. 7, and then drive unit 18f of front derailleur 97f is further connected to drive unit 18r of rear derailleur 97r through a four-wire cable that runs along chainstay 102d and contains all of the signals except for the front derailleur shift command signals FDS.

Figure 4:
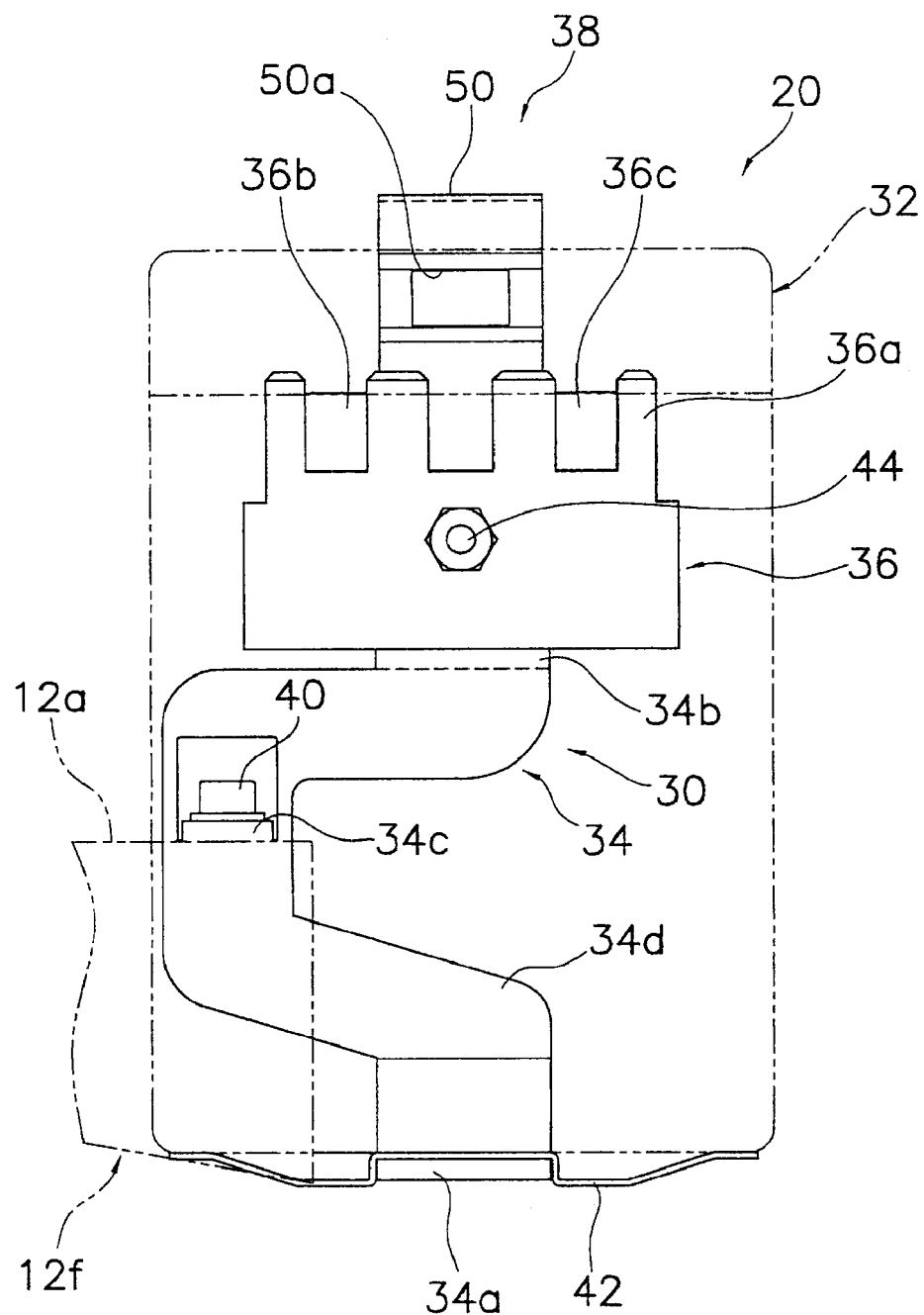
FIG. 4 is a side view of a power supply unit.
Figure 5:
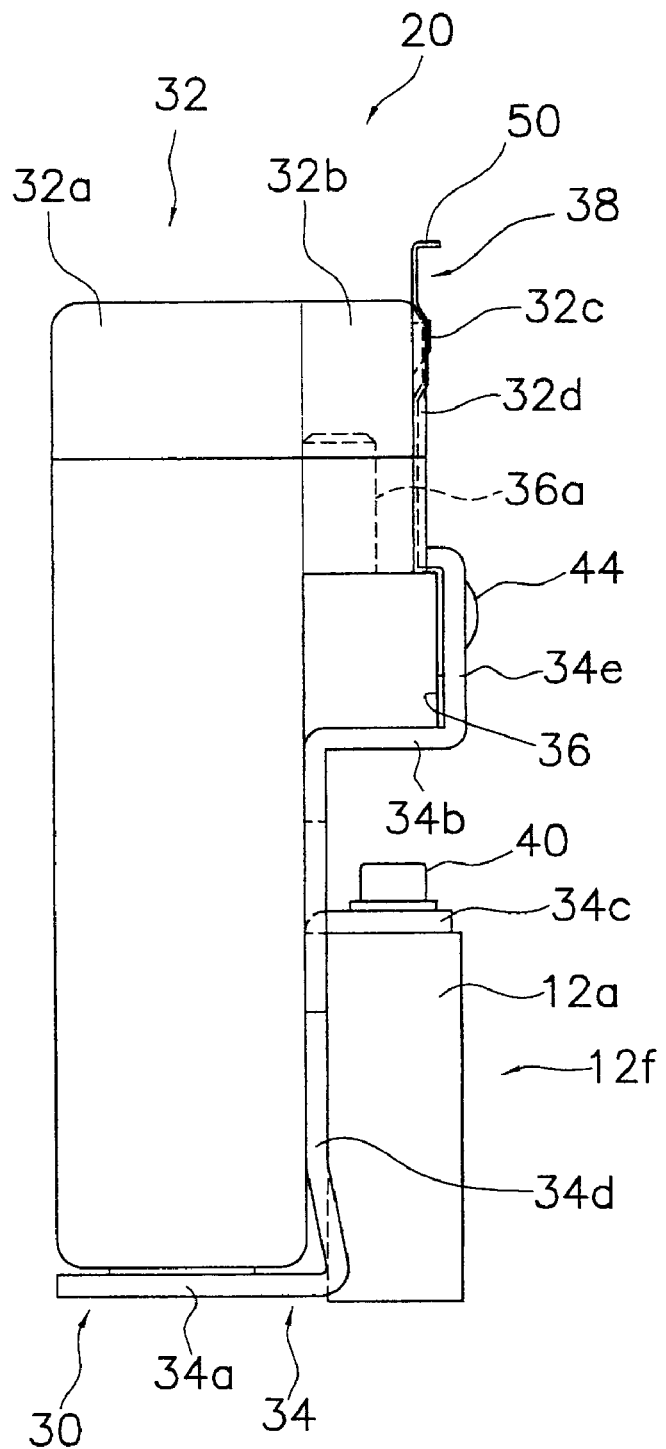
FIG. 5 is a rear view of the power supply unit.
Figure 6:
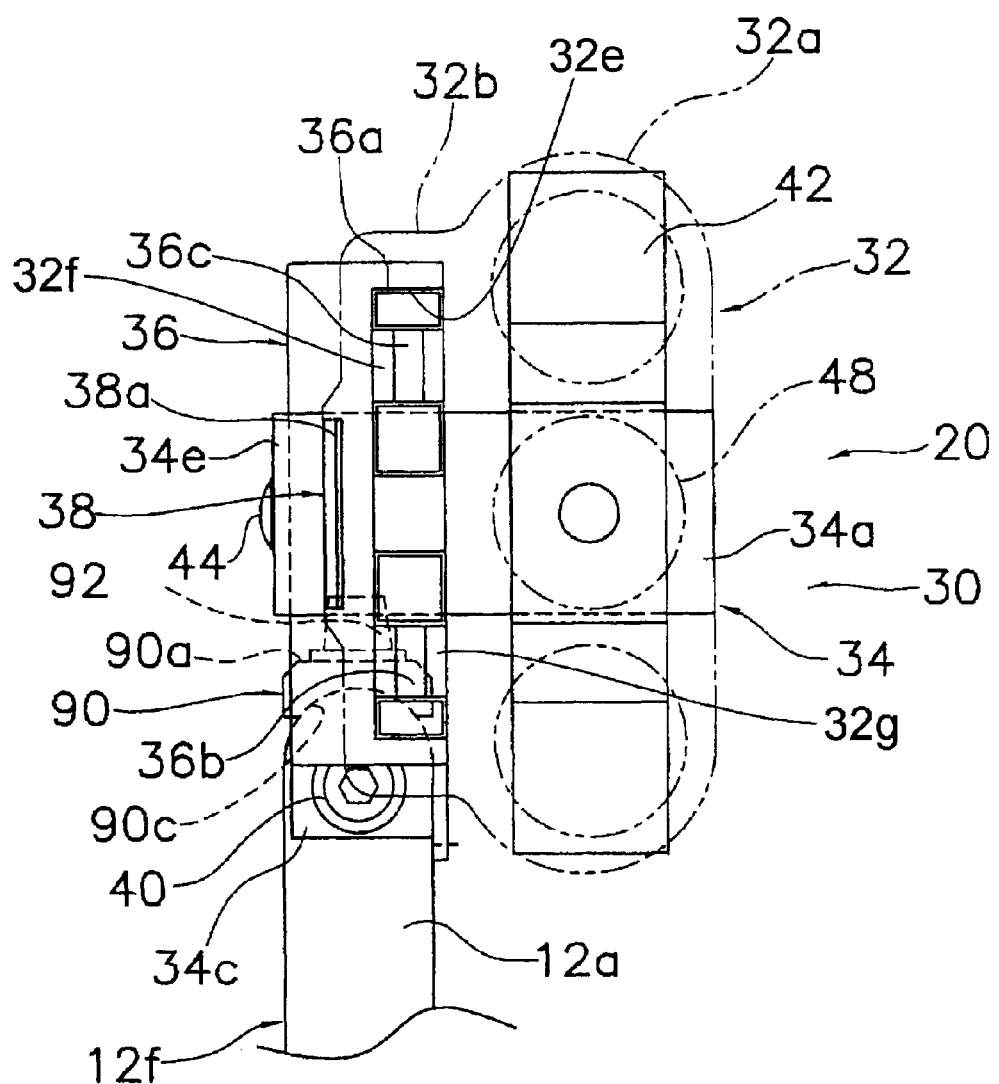
FIG. 6 is a plan view of the power supply unit.

As shown in FIG. 2, power supply unit 20 is disposed forward (to the right) of link mechanism 16f and above chain guide 14f. As shown in FIGS. 4-6, power supply unit 20 comprises a mounting bracket 30 and a power supply 32, wherein mounting bracket 30 is structured to be mounted to mounting member 12f of front derailleur 97f, and power supply 32 is structured to be detachably mounted to mounting bracket 30. As used herein and in the claims, the word "detachable" means capable of removal or separation without breaking or causing damage through the necessary use of undue force. A connector 36 is mounted to mounting bracket 30 for providing electrical connection to power supply 32 and to the other electrical components in the system, and a lock unit 38 is provided to prevent power supply 32 from being inadvertently removed from mounting bracket 30.

Mounting bracket 30 comprises a bracket main body 34 that may be formed by bending and cutting a plate member. Bracket main body 34 includes a power supply mounting portion 34a on which power supply 32 is mounted, a connector supporting portion 34b on which connector 36 is supported, a bracket mounting portion 34c disposed between power supply mounting portion 34a and connector supporting portion 34b and structured to be mounted to the top of mounting member 12f by a fixing bolt 40, an intermediate portion 34d that connects power supply mounting portion 34a and connector supporting portion 34b, and a connector mounting portion 34e for attaching connector 36. As shown in FIG. 4, intermediate portion 34d extends upward and leftward from power supply mounting portion 34a, and connector supporting portion 34b extends from intermediate portion 34d in an opposite direction from power supply mounting portion 34a. A plate spring 42 is disposed at power supply mounting portion 34a for lifting power supply 32 when removing power supply 32 from bracket main body 34.

Connector 36 is attached to connector mounting portion 34e by a screw 44. Connector 36 includes an engaging protrusion portion 36a and male electrical contacts 36b and 36c. Engaging protrusion portion 36a mates with a complementary engaging recesses 32e (FIG. 6) disposed in a coupling portion 32b of power supply 32, and electrical contacts 36b and 36c mate with complementary female electrical contacts 32f and 32g in coupling portion 32b of power supply 32.

Power supply 32 has a battery accommodating portion 32a, a coupling portion 32b, a locking claw 32c, and a pair of guide protrusions 32d. Battery accommodating portion 32a is dimensioned to hold a plurality of secondary batteries 48 such as lithium ion batteries, nickel hydrogen batteries, nickel cadmium batteries, etc., connected in series or parallel. Coupling portion 32b extends laterally relative to battery accommodating portion 32a and detachably mates with connector 36 as noted above. Locking claw 32c engages lock unit 38, and guide protrusions 32d guide lock unit 38 into engagement with coupling portion 32b in a manner described below. The upper tip of locking claw 32c protrudes upward.

Lock unit 38 comprises locking claw 32c of power supply 32 and a lock member 50. Lock member 50 is attached to connector attaching portion 34e of bracket main body 34 together with connector 36 by screw 44. Lock member 50 extends upwardly from connector mounting portion 34e of bracket main body 34 and may comprise an elastic plate material so that lock member 50 may bend slightly away from coupling portion 32b of power supply 32. As shown in FIG. 4, an upper portion of lock member 50 includes a rectangular lock opening 50a that engages locking claw 32c as shown in FIG. 5 to lock power supply 32 in place on mounting bracket 30. Lock member 50 is bent away from locking claw 32c to detach power supply 32 from bracket main body 34.

To assemble front derailleur 97f to seat tube 102a, frame mounting base 90 is welded or otherwise attached to seat tube 102a, and mounting bracket 30 is attached to mounting portion 12a of mounting member 12f by attaching mounting portion 34c of bracket main body 34 to mounting member 12f with screw 40. When mounting power supply 32, coupling portion 32b and female contacts 32f and 32g are engaged with engaging protrusion portion 36a and male contacts 36b and 36c of connector 36, and lock member 50 is hooked to locking claw 32c such that guide protrusions 32d straddle lock member 50 to lock power supply 32 to bracket main body 34. As a result, electric power from power supply 32 is supplied to drive unit 18f via connector 36. If modular connectors are used, drive unit 18f of front derailleur 97f and drive unit 18r of rear derailleur 97r are connected with wiring 152-154 and 156; and drive unit 18f, shift control devices 121f and 121r and display unit 118 are connected with wiring 152-156 so that electric power from power supply 32 is supplied to rear derailleur 97r, shift control devices 121f and 121r and display unit 118. After the connections are complete, front and rear derailleurs 97f and 97r may be electrically controlled by shift command signals generated by upshift switches 131f and 131r and downshift switches 133f and 133r of shift control devices 121f and 121r.

When it is desirable to recharge or replace power supply 32, lock member 50 of lock unit 38 is bent outward to disengage it from locking claw 32c, power supply 32 is pushed slightly upward by the biasing force of spring 42, and the user then disconnects power supply 32 from connector 36. The new or recharged power supply 32 then may be mounted to connector 36 and mounting bracket 30 in the same manner discussed above.

In this embodiment, power supply unit 20 is provided at front derailleur 97f, so the wiring from power supply unit 20 to drive unit 18f can be made as short as possible. Since front derailleur 97f requires a large force to shift the chain and consumes more electric power relative to rear derailleur 97r, wasteful consumption of electric power by wiring resistance can be suppressed. Also, the time and effort needed to mount power supply unit 20 to frame 102 is substantially reduced as a result of the simple modular and detachable locking structures. Since power supply unit 20 is attached to mounting member 12f for mounting derailleur 97f to frame 102, power supply unit 20 is integrated with derailleur 97f, so both units may be mounted to frame 102 simply by mounting derailleur 97f to frame 102 as a single unit.

Figure 8:
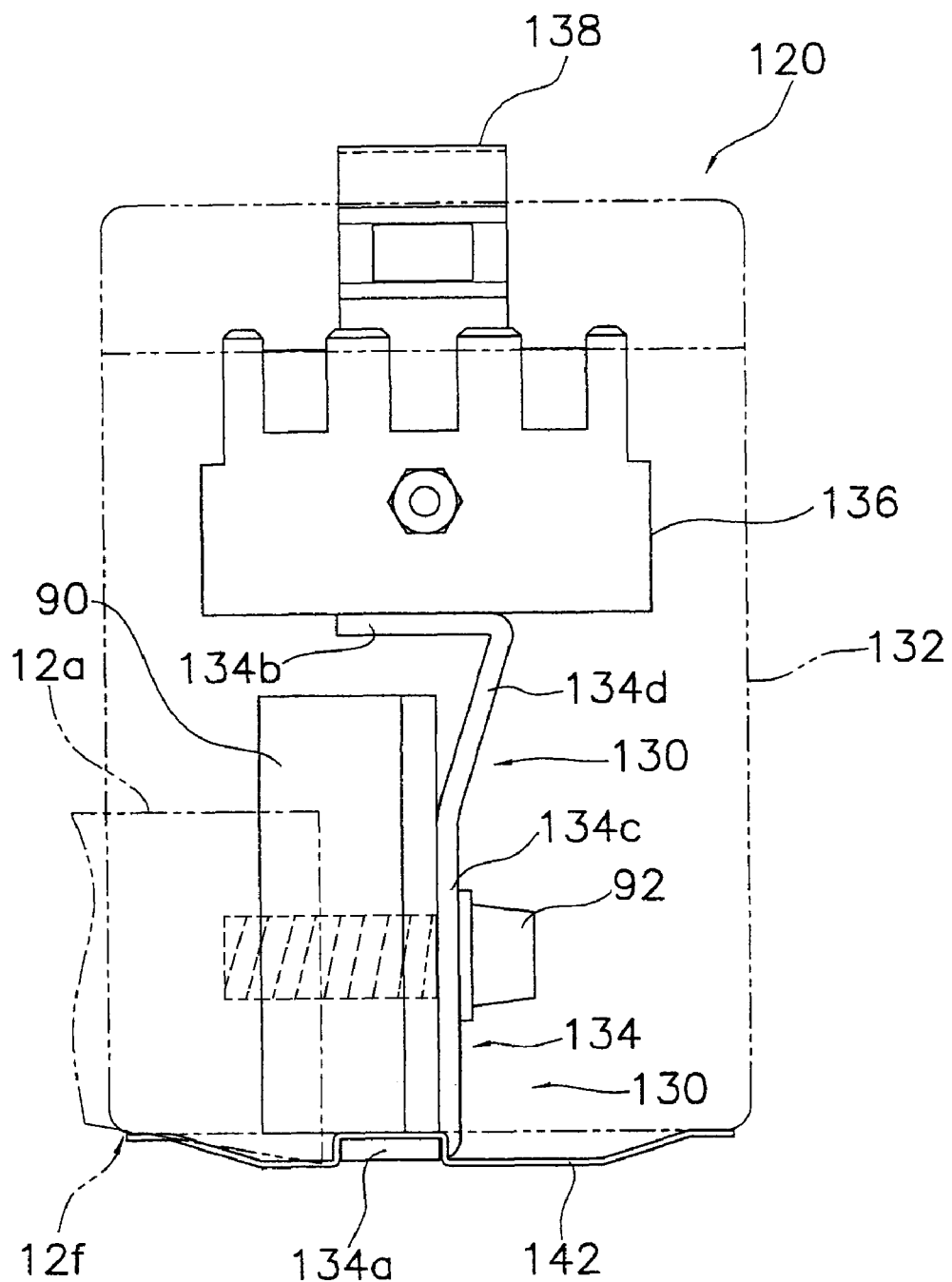
FIG. 8 is a side view of another embodiment of a power supply unit.

FIG. 8 is a side view of another embodiment of a power supply unit 120. In the above described embodiment, power supply unit 20 is indirectly mounted to frame mounting base 90 through mounting member 12f of front derailleur 97f, but in this embodiment a mounting bracket 130 of power supply unit 120 is mounted to frame mounting base 90 in parallel with mounting member 12f through a fixing bolt 92. As with the first embodiment, mounting bracket 130 has a bracket main body 134, and a connector 136 is mounted to bracket main body 134. Bracket main body 134 has a power supply mounting portion 134a, a connector supporting portion 134b, a bracket mounting portion 134c, an intermediate portion 134d and a connector mounting portion (not shown). Power supply mounting portion 134a projects perpendicular to the paper surface of FIG. 8. Connector supporting portion 134b is disposed above frame mounting base 90. Everything except for the shape of bracket main body 134 has the same construction as in the first embodiment, so a detailed explanation thereof will be omitted. As a result of this construction, power supply unit 120 can be mounted to mounting base 90 simultaneously with a direct mounting type electric derailleur without using a separate mounting member.

Figure 9:
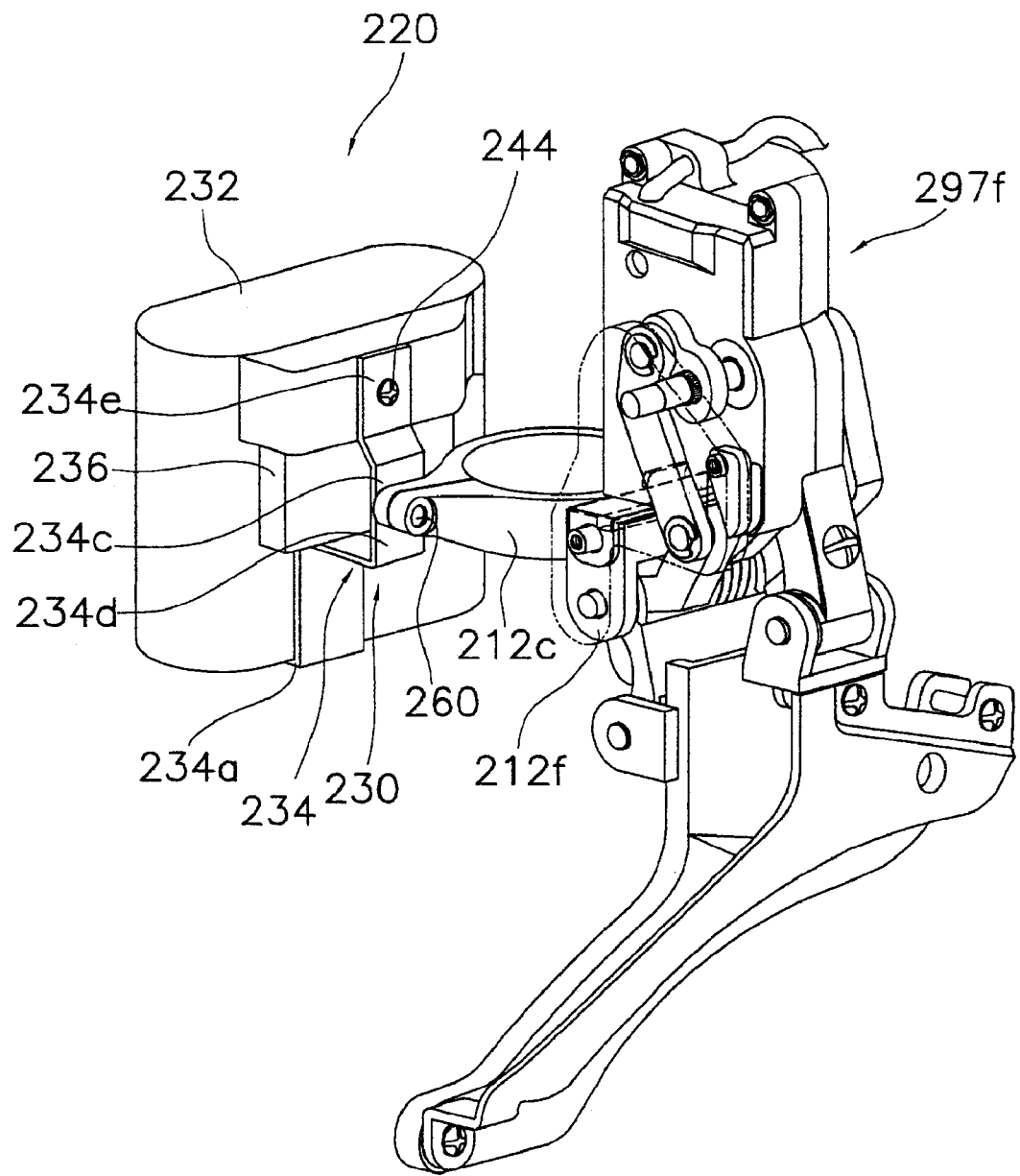
FIG. 9 is a rear oblique view of another embodiment of a front derailleur apparatus.

FIG. 9 is a side view of another embodiment of a power supply unit 220 used with a front derailleur 297f. In this embodiment, a mounting member 212f for derailleur 297f has a mounting band 212c structured to be mounted to frame 102 by a fastening bolt 260. A mounting bracket 230 of a power supply unit 220 is fixed to mounting band 212c by fastening bolt 260. Mounting bracket 230 has a bracket main body 234, and a connector 236 is mounted to bracket main body 234. As in the first embodiment, bracket main body 234 may formed by bending and cutting a plate material, and it comprises a power supply mounting portion 234a, a bracket mounting portion 234c, an intermediate portion 234d and a connector mounting portion 234e. Everything except for the shape of bracket main body 234 has the same construction as in the first embodiment, so a detailed description shall be omitted.

While the above is a description of various embodiments of inventive features, further modifications may be employed without departing from the spirit and scope of the present invention. For example, if frame mounting base 90 has the form of a mounting band, then the power supply unit may be mounted to the frame mounting base with a fastening bolt as in FIG. 9 instead of through a fixing bolt. While power supply unit 20 was provided at front derailleur 97f, the power supply unit may be provided at rear derailleur 97r. While a secondary battery was used as the power supply, the power supply may be a primary battery, a capacitor, and especially a large-capacitance capacitor such as an electric double layer capacitor. In the case of a primary battery, the power supply unit is primarily a battery case in which the battery is placed. Such a battery case may be fixed to mounting bracket 30 so that only the battery needs to be replaced. When the power supply is a capacitor, then the power supply may be permanently fixed to the mounting bracket. If desired, a generator such as a rim dynamo or a hub dynamo may be mounted to the bicycle, and electric power from the generator may be rectified and stored in the capacitor. In this case, a rectifying circuit and a voltage regulator may be provided in the power supply unit.

While a four-bar link mechanism was disclosed as the coupling unit between the mounting member and the chain guide, many other types of coupling mechanisms may be used. For example, a screw guide may be used for the coupling mechanism. While the lock unit 38 was provided at connector 36, lock unit 38 may be provided at coupling portion 32b of power supply 32. While the shift control unit 127f and the motor drive unit 126f were provided at drive unit 18f, either of these or other components may be provided at the power supply unit 20. If desired, such components may be separately mounted to mounting bracket 30 instead of or in addition to being mounted to power supply 32. If desired, the front and rear derailleurs may be controlled by one shift control unit. While the power supply unit 20 was mounted on the top surface of mounting portion 12a of mounting member 12f, power supply unit 20 may be mounted to a side surface or a bottom surface of mounting portion 12a.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle derailleur apparatus comprising:
   a derailleur including a mounting member adapted to be mounted to a bicycle frame and a chain guide coupled to the mounting member so that the chain guide moves relative to the mounting member; and
   a power storing unit supported by the derailleur, wherein the power storing unit includes:
      a mounting bracket that is a distinct and separate member from the mounting member;
      a power storing element; and
      a power storing element accommodating portion that houses the power storing element;
      wherein the power storing element accommodating portion is formed separately from the mounting bracket so that the power storing element accommodating portion is a distinct and separate member from the mounting bracket and is coupled externally to the mounting bracket; and
   wherein the mounting member is structured as a common mounting member that mounts both the chain guide and the power storing unit to the bicycle frame so that the mounting member carries both the power storing unit and the chain guide.

2. The apparatus according to claim 1 wherein the power storing unit is stationary relative to the mounting member.

3. The apparatus according to claim 2 wherein the power storing unit is attached to the mounting member.

4. The apparatus according to claim 3 wherein the mounting member is structured to be immovably mounted to the bicycle frame.

5. The apparatus according to claim 1 wherein the mounting member is structured to be mounted to the bicycle frame by a fastener, and wherein the power storing unit is supported to the derailleur by the fastener.

6. The apparatus according to claim 1 wherein the mounting member comprises an attachment band.

7. The apparatus according to claim 6 wherein the attachment band is structured to be mounted to the bicycle frame by a fastener, and wherein the power storing unit is structured to be supported to the derailleur by the fastener.

8. The apparatus according to claim 1 wherein the power storing element comprises a battery.

9. The apparatus according to claim 1 wherein the power storing element accommodating portion is detachably coupled externally to the mounting bracket.

10. The apparatus according to claim 9 further comprising an electrical connector coupled to the mounting bracket and structured to externally electrically couple to the power storing element accommodating portion so that the power storing element accommodating portion is disposed at an outside surface of an outside wall of the mounting bracket.

11. The apparatus according to claim 9 further comprising a lock unit that selectively locks the power storing element accommodating portion to the mounting bracket so that the power storing element accommodating portion is disposed at an outside surface of an outside wall of the mounting bracket.

12. The apparatus according to claim 1 wherein the chain guide is structured to move a bicycle chain among a plurality of front sprockets attached to a pedal crank.

13. The apparatus according to claim 12 wherein the power storing unit is disposed above the chain guide.

14. The apparatus according to claim 13 further comprising a coupling unit that couples the chain guide to the mounting member so that the chain guide moves relative to the mounting member, and wherein the power storing unit is disposed forward of the coupling unit.

15. The apparatus according to claim 1 wherein the power storing unit is supported by the derailleur so that the bicycle frame is disposed between the power storing unit and the chain guide when the derailleur is mounted to the bicycle frame.

16. The apparatus according to claim 15 wherein the mounting member comprises an attachment band.

17. The apparatus according to claim 1 further comprising an electric drive unit that moves the chain guide relative to the mounting member, wherein the electric drive unit is supported by the derailleur.

18. The apparatus according to claim 17 wherein the power storing unit provides operating power to the electric drive unit.

19. The apparatus according to claim 5 wherein the power storing unit is mounted to the derailleur by the fastener and the fastener fasteningly engages the power storing unit so that the mounting member and the power storing unit are mounted to the bicycle frame by a common fastener.

20. The apparatus according to claim 7 wherein the power storing unit is mounted to the attachment band by the fastener and the fastener fasteningly engages the power storing unit so that the mounting member and the power storing unit are mounted to the bicycle frame by a common fastener.

21. The apparatus according to claim 20 wherein the derailleur is disposed substantially opposite to the power storing unit so that the bicycle frame is disposed between the power storing unit and the derailleur when the derailleur is mounted to the bicycle frame.

22. The apparatus according to claim 10 wherein the mounting bracket comprises:
   a power supply mounting portion that supports the power storing element accommodating portion so that the power storing element accommodating portion is disposed at an outside surface of an outside wall of the mounting bracket; and
   a connector mounting portion for mounting the electrical connector to the mounting bracket.

23. The apparatus according to claim 22 wherein the power supply mounting portion forms a first ledge upon which the power storing element accommodating portion is supported.

24. The apparatus according to claim 23 wherein the mounting bracket further comprises a connector supporting portion that forms a second ledge upon which the electrical connector is supported.

25. The apparatus according to claim 23 further comprising a biasing member that biases the power storing element accommodating portion away from the first ledge.

26. The apparatus according to claim 23 further comprising a lock unit that selectively locks the power storing element accommodating portion to the mounting bracket, wherein the lock unit comprises a lock member mounted to the mounting bracket so that the power storing element accommodating portion is retained on the first ledge.

27. The apparatus according to claim 26 wherein the lock member is structured so that the lock member can be manipulated to detach the power storing element accommodating portion from the first ledge without detaching the lock member from the mounting bracket.

28. The apparatus according to claim 11 wherein the lock unit comprises a lock member mounted to the mounting bracket and structured so that the lock member can be manipulated to detach the power storing element accommodating portion from the mounting bracket without detaching the lock member from the mounting bracket.

29. The apparatus according to claim 1 further comprising a drive unit including a microprocessor mounted to the mounting member, wherein the power storing unit provides operating electric power to the microprocessor.

30. The apparatus according to claim 1 further comprising a drive unit including an electric motor mounted to the mounting member so that the mounting member functions as a common mounting member that mounts the chain guide, the power storing unit and the electric motor to the bicycle frame.

31. The apparatus according to claim 1 wherein the power storing unit is structured to be indirectly mounted to the bicycle frame through the mounting member.

32. The apparatus according to claim 1 wherein the power storing unit is structured to be mounted to the bicycle frame in parallel with the mounting member.

33. The apparatus according to claim 32 wherein the power storing unit and the mounting member are structured to be mounted to the bicycle frame through a common fastener that fasteningly engages both the power storing unit and the mounting member.

* * * * *